United States Patent
Winzer et al.

(10) Patent No.: US 9,419,722 B2
(45) Date of Patent: Aug. 16, 2016

(54) FEEDBACK FOR ELECTRONIC PRE-DISTORTION IN AN OPTICAL TRANSMITTER

(71) Applicant: Alcatel-Lucent USA Inc., Murray Hill, NJ (US)

(72) Inventors: Peter J. Winzer, Aberdeen, NJ (US); Andrew Adamiecki, Morganville, NJ (US); Chandrasekhar Sethumadhavan, Old Bridge, NJ (US); Gregory Raybon, Shrewsbury, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 64 days.

(21) Appl. No.: 14/469,708

(22) Filed: Aug. 27, 2014

(65) Prior Publication Data
US 2016/0065311 A1    Mar. 3, 2016

(51) Int. Cl.
| H04B 10/58 | (2013.01) |
| H04B 10/588 | (2013.01) |
| H04B 10/25 | (2013.01) |
| H04B 10/564 | (2013.01) |

(52) U.S. Cl.
CPC ............ *H04B 10/58* (2013.01); *H04B 10/2504* (2013.01); *H04B 10/564* (2013.01); *H04B 10/588* (2013.01)

(58) Field of Classification Search
None
See application file for complete search history.

(56) References Cited

U.S. PATENT DOCUMENTS

| 5,850,305 | A | * | 12/1998 | Pidgeon | H04B 10/5051 372/32 |
| 6,313,701 | B1 | | 11/2001 | Mussino et al. | |
| 7,426,350 | B1 | | 9/2008 | Sun et al. | |
| 7,925,170 | B2 | | 4/2011 | Ishaug | |
| 8,145,066 | B2 | | 3/2012 | Painchaud et al. | |
| 8,269,431 | B2 | | 9/2012 | Then et al. | |
| 8,331,800 | B2 | | 12/2012 | Essiambre et al. | |
| 8,396,374 | B2 | | 3/2013 | Mizuochi et al. | |
| 2004/0218931 | A1 | | 11/2004 | Frederiksen, Jr. et al. | |
| 2004/0223768 | A1 | | 11/2004 | Shastri et al. | |
| 2009/0232518 | A1 | * | 9/2009 | Caton | H04B 10/5051 398/193 |
| 2010/0315018 | A1 | * | 12/2010 | Then | H04B 10/588 315/291 |
| 2011/0280582 | A1 | | 11/2011 | Piehler | |
| 2012/0057863 | A1 | | 3/2012 | Winzer et al. | |

(Continued)

OTHER PUBLICATIONS

Morgan, D. R., et al., "A Generalized Memory Polynomial Model for Digital Predistortion of RF Power Amplifiers," IEEE Transactions on Signal Processing, 2006, vol. 54, No. 10, pp. 3852-3860.

(Continued)

*Primary Examiner* — Darren E Wolf
(74) *Attorney, Agent, or Firm* — Mendelsohn Dunleavy, P.C.; Yuri Gruzdkov

(57) ABSTRACT

We disclose an optical transponder, in which one or more all-electronic feedback paths are used to obtain a relatively accurate estimate of the device-specific signal distortions in the transmitter portion thereof. The obtained estimate is used to enable the digital signal processor of the optical transponder to carry out electronic pre-distortion (EPD) that can significantly reduce or cancel these signal distortions without the use of detailed factory-calibration measurements or optics dedicated to feedback purposes. The use of all-electronic feedback paths may enable a beneficial reduction in the cost of the EPD functionality, e.g., by eliminating a significant extra cost associated with the implementation of optically generated feedback.

17 Claims, 5 Drawing Sheets

(56) References Cited

U.S. PATENT DOCUMENTS

2014/0010533 A1* 1/2014 Yan ................... H04B 10/564
398/38
2014/0029957 A1 1/2014 Sethumadhavan et al.

OTHER PUBLICATIONS

Waegemans, Robert, "Digital Electronic Predistortion for Optical Communications," Thesis for the degree of Doctor of Philosophy, Department of Electronic and Electrical Engineering, University College London, 2009, (161 pages).

Alferness, Rod C., "Waveguide Electrooptic Modulators," IEEE Transactions on Microwave Theory and Techniques, vol. MTT-30, No. 8, 1982, pp. 1121-1137.

Ghannouchi, Fadhel M. et al., Behavioral Modeling and Predistortion, IEEE Microwave Magazine, Dec. 2009, pp. 52-64.

Sotoodeh, Mohammad et al., "Modulator Bias and Optical Power Control of Optical Complex E-Field Modulators," Journal of Lightwave Technology, vol. 29, No. 15, Aug. 1, 2011, pp. 2235-2248.

Nelson, Haydn et al., "Digital Predistortion Techniques for Mobile PA Test," High Frequency Electronics, Digital Edition, Jun. 2014 (12 pages).

Warm, Stefan, "Electronic Predistortion Strategies for Directly Modulated Laser Systems," Doctorate Dissertation for Electrical Engineering and Computer Science Degree, Technical University at Berlin, Apr. 2009, (123 pages).

Winzer, Peter J. et al., "Multi-electrode Photonic Digital to Analog Converting Vector Modulator," U.S. Appl. No. 14/202,703, filed Mar. 10, 2014.

International Search Report and Written Opinion; Mailed Nov. 23, 2015 for PCT Application No. PCT/US2015/047076.

* cited by examiner

100

FEEDBACK FOR ELECTRONIC PRE-DISTORTION IN AN OPTICAL TRANSMITTER

BACKGROUND

1. Field

The present disclosure relates to optical communication equipment and, more specifically but not exclusively, to the generation of feedback signals for electronic pre-distortion in an optical transmitter.

2. Description of the Related Art

This section introduces aspects that may help facilitate a better understanding of the disclosure. Accordingly, the statements of this section are to be read in this light and are not to be understood as admissions about what is in the prior art or what is not in the prior art.

Optical transponders are critical elements within optical transport systems. A continued trend in the development of optical transponders is towards higher integration and higher modulation speeds. However, the use of a relatively high modulation speed tends to exacerbate to a significant degree the performance penalty caused by non-optimal frequency characteristics of certain integrated components of the optical transponder.

SUMMARY OF SOME SPECIFIC EMBODIMENTS

Disclosed herein are various embodiments of an optical transponder, in which one or more all-electronic feedback paths are used to obtain a relatively accurate estimate of the device-specific signal distortions in the transmitter portion thereof. The obtained estimate is used to enable the digital signal processor of the optical transponder to carry out electronic pre-distortion (EPD) that can significantly reduce or cancel these device-specific signal distortions without the use of detailed factory-calibration measurements or optics dedicated to feedback purposes. The use of all-electronic feedback paths may enable a beneficial reduction in the cost of the EPD functionality, e.g., by eliminating a significant extra cost associated with the implementation of optically generated feedback.

In some embodiments, the one or more all-electronic feedback paths may be used in parallel with one or more partially optical feedback paths.

According to one embodiment, provided is an apparatus comprising: an optical transmitter configured to generate a modulated optical signal based on an electrical digital signal; a digital signal processor configured to apply electronic pre-distortion to generate the electrical digital signal in a manner that reduces an amount of signal distortion in the modulated optical signal caused by hardware of the optical transmitter; and a first all-electronic feedback path between the optical transmitter and the digital signal processor configured to provide a first feedback signal for the digital signal processor to determine one or more parameter values for the electronic pre-distortion.

According to another embodiment, provided is an electronic pre-distortion method comprising the steps of: (A) configuring an optical transmitter to generate an optical output signal carrying a training data sequence; (B) receiving, via a first all-electronic feedback path, a first feedback signal, wherein the first all-electronic feedback path is configured to electrically connect the optical transmitter and a digital signal processor; (C) determining one or more parameter values for electronic pre-distortion based on the first feedback signal; and (D) configuring the optical transmitter to generate an optical signal carrying payload data with the digital signal processor being configured to apply the electronic pre-distortion to the payload data using the one or more parameter values.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
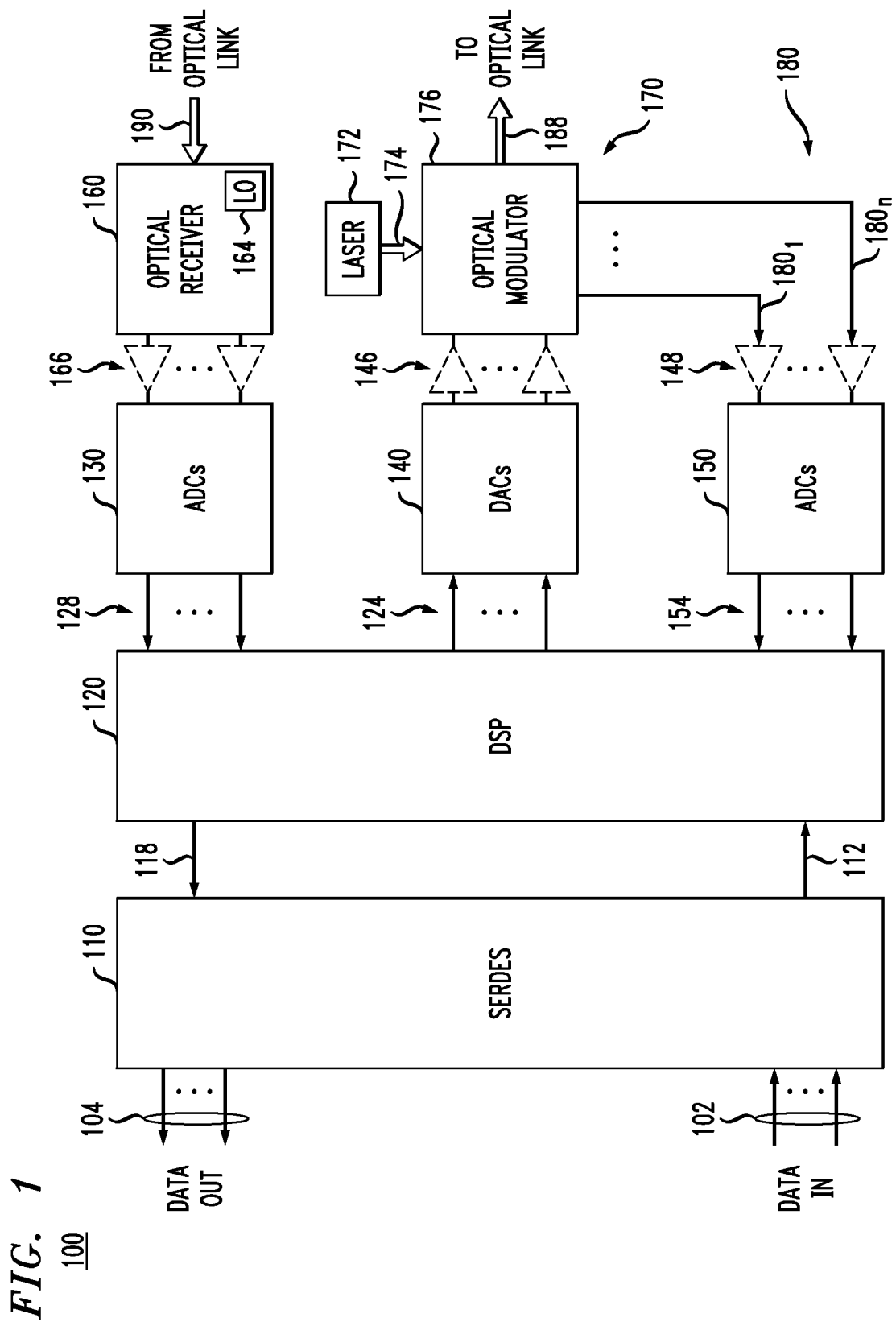
FIG. 1 shows a block diagram of an optical transponder according to an embodiment of the disclosure.

Modern high-speed optical transponders may use digital pulse shaping (such as Nyquist pulse shaping, root-raised-cosine pulse shaping, etc.) and/or electronic pre-distortion (EPD) to compensate the deleterious effects of certain fundamental or spurious transmit-side hardware impairments. For example, one of the fundamental transmit-side hardware impairments may be related to the inherent nonlinear (e.g., sinusoidal) transfer characteristics of an optical (e.g., Mach-Zehnder) modulator. It is anticipated that accurate compensation of hardware impairments will play an increasingly critical role in the design and operation of highly integrated low-cost optical transponders capable of meeting high-quality performance standards.

In some prior-art optical transponders, no feedback at all is used to control the EPD in the transmitter. In some of these cases, the digital signal processor (DSP) of the optical transponder is configured to modify the drive signal(s) applied to the optical modulator in the transmitter essentially based on a best-guess estimate of the hardware imperfections and/or impairments, e.g. associated with digital-to-analog converters (DACs), driver amplifiers, and optical modulators. Disadvantageously, the best-guess estimate may not be accurate enough to avoid unacceptably large performance penalties due to significant differences between nominally identical optical transmitters of the same model, e.g., caused by fabrication-process variances, device aging, etc.

Some optical transponders may be configured to use some form of optical feedback to control the EPD in the transmitter. For example, the feedback generation may include (i) tapping the optical output signal generated by the transmitter, (ii) converting the tapped optical signal into a corresponding electrical signal using a dedicated photo-detector or optical receiver, and (iii) feeding a digital version of this electrical signal to the DSP for setting the parameters of and controlling the EPD implemented therein. While this optical feedback scheme may overcome some of the above-indicated drawbacks of the best-guess approach, it also incurs the extra cost of a photo-detector or an optical receiver dedicated exclusively to feedback purposes in the corresponding optical transponder.

At least some of the above-indicated problems in the state of the art are addressed by various embodiments of a disclosed optical transponder, in which an all-electronic feedback path enables the DSP to have access to a large portion of the device-specific information on hardware-induced signal distortions, thereby enabling the DSP to implement the EPD capable of accurately compensating the deleterious effects of hardware imperfections and/or impairments without dedicated optics or detailed factory calibration measurements. In some embodiments, the all-electronic feedback path may be used in parallel and in combination with an optical feedback path. Various embodiments of an optical transponder that incorporates an all-electronic feedback path, with or without an additional optical feedback path, are described in more detail below in reference to FIGS. 1-6.

FIG. 1 shows a block diagram of an optical transponder 100 according to an embodiment of the disclosure. Transponder 100 is designed for bidirectional data transmission over an optical transport link, e.g., including an optical fiber or a fiber-optic cable (not explicitly shown in FIG. 1). As such, transponder 100 includes a receiver portion and a transmitter portion. In an example embodiment, the receiver portion of transponder 100 comprises a coherent optical receiver 160, including an optical local-oscillator (LO) source 164. The transmitter portion of transponder 100 comprises an optical transmitter 170, including a laser 172 and an optical modulator 176.

In operation, receiver 160 receives an optical input signal 190 from the optical transport link as indicated in FIG. 1. Optical LO source 164 generates an optical reference signal having an optical-carrier frequency (wavelength) that is sufficiently close to that of optical signal 190 to enable coherent (e.g., intradyne or homodyne) detection of the latter signal. For this purpose, optical LO source 164 may include a relatively stable tunable laser whose output wavelength is approximately the same as the carrier wavelength of optical signal 190. Receiver 160 optically mixes optical signal 190 and the reference signal generated by optical LO source 164 to generate a plurality of mixed optical signals (not explicitly shown in FIG. 1). An optical-to-electrical (O/E) converter of receiver 160 then converts the mixed optical signals into a corresponding plurality of electrical signals, e.g., indicative of complex values corresponding to two orthogonal-polarization components of signal 190. For example, a first pair of the electrical signals may be an analog in-phase signal and an analog quadrature signal, respectively, corresponding to a first (e.g., x) polarization component of signal 190. A second pair of the electrical signals may similarly be an analog in-phase signal and an analog quadrature signal, respectively, corresponding to a second (e.g., y) polarization component of signal 190.

Each of the electrical signals generated by receiver 160 is optionally amplified in a respective one of electrical amplifiers 166 and converted into a digital form 128 in a corresponding one of a plurality of analog-to-digital converters (ADCs) 130. Electrical digital signals 128 produced by ADCs 130 are then processed by a DSP 170, e.g., as known in the art, to recover the data of a data stream 118 encoded in optical signal 190. A serializer/deserializer (SERDES) 110 operates to appropriately de-serialize data stream 118 into a plurality of sub-streams 104 for distribution to the clients of transponder 100 over the data plane of the corresponding communication system (not explicitly shown in FIG. 1).

Transmitter 170 operates to generate an optical output signal 188 for transmission over the optical transport link in a manner that causes optical signal 188 to carry data received by transponder 100, via a plurality of sub-streams 102, from the data plane of the communication system. SERDES 110 is configured to appropriately serialize sub-streams 102 to generate a data stream 112 that is then encoded in optical signal 188. More specifically, DSP 120 processes data stream 112 to generate a plurality of electrical digital signals 124. Each of electrical digital signals 124 is converted into an analog form in a corresponding one of a plurality of DACs 140, and the resulting electrical analog signals are amplified and biased, using electrical amplifiers 146, to generate drive signals for driving optical modulator 176. Using the drive signals, optical modulator 176 then modulates a CW optical beam 174 received from laser 172 to generate optical signal 188.

In an example embodiment, DSP 120 uses a suitable EPD method to generate electrical digital signals 124 in a manner that tends to cancel signal distortions caused or imposed by some of the downstream circuits in transponder 100, e.g., DACs 140, electrical amplifiers 146, and optical modulator 176. An example embodiment of the EPD method that can be used in DSP 120 is described in more detail below in reference to FIG. 4. Briefly, the EPD method used in DSP 120 may operate based on a plurality of feedback signals 154 provided to the DSP via a plurality of all-electronic feedback paths 180 (labeled $180_1$-$180_n$, where n is a positive integer greater than one). As used herein, the term "all-electronic" means that feedback paths 180 do not use or have any optical-to-electrical (O/E) or electrical-to-optical (E/O) converters therein. This feature characterizes both terminal portions of each feedback path $180_i$ (where i=1, . . . n) and its middle portion.

For example, an i-th feedback path $180_i$ may have an electrical pick-up terminal located in the electrical-circuit portion of optical modulator 176. An electrical signal picked-up by or applied to the electrical pick-up terminal of feedback path $180_i$ may propagate along an electrical conductor to an input port of one of (optional) electrical amplifiers 148. A corresponding amplified electrical signal generated by electrical amplifier 148 is then converted into digital form in the corresponding one of ADCs 150 to generate a respective one of feedback signals 154. Note that the feedback signal remains in the electrical domain all the way from its pick-up point at the first end terminal of feedback path $180_i$ located in the electrical-circuit portion of optical modulator 176 to its drop-off point at the second end terminal of feedback path $180_i$ connected to the input interface of DSP 120. No portion of feedback signal 154 is generated using an optically tapped portion of the power of optical signal 188.

Figure 2:
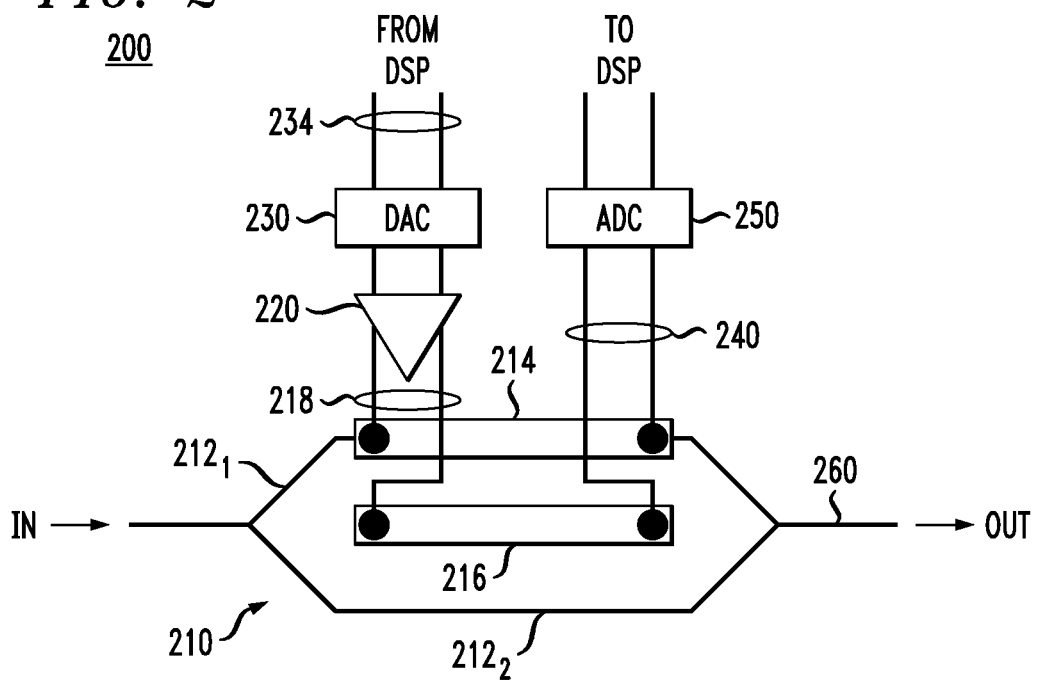
FIG. 2 shows a block diagram of an electro-optic circuit that can be used in the transponder of FIG. 1 according to an embodiment of the disclosure.

FIG. 2 shows a block diagram of an electro-optic circuit 200 that can be used in transponder 100 (FIG. 1) according to an embodiment of the disclosure. Circuit 200 includes a Mach-Zehnder modulator 210 that can be a part of optical modulator 176 (FIG. 1). In some embodiments, optical modulator 176 may include two or more modulators similar to modulator 210. In different embodiments, these two or more modulators may be arranged in a nested configuration, be connected to each other in a serial or parallel configuration, or be optically unconnected to one another.

Modulator 210 comprises two waveguide arms, labeled $212_1$ and $212_2$, and electrodes 214 and 216. Electrode 214 is positioned over waveguide arm $212_1$, as indicated in FIG. 2. Electrode 216 is positioned between waveguide arms $212_1$ and $212_2$, as further indicated in FIG. 2.

An electrical amplifier 220 is configured to drive modulator 220 by applying a radio-frequency (RF) drive signal 218 to electrodes 214 and 216. Drive signal 218 is generated based on an electrical digital signal 234 received by circuit 200 from the corresponding DSP, e.g., DSP 120 of FIG. 1, by first converting electrical digital signal 234 into a corresponding electrical analog signal in a DAC 230, and then amplifying and biasing this analog signal in amplifier 220. In an example embodiment, DAC 230 can be one of DACs 140 (FIG. 1), and amplifier 220 can be one of amplifiers 146 (FIG. 1).

When the modulation speed is relatively high, electrodes 214 and 216 are conventionally designed to operate as traveling-wave electrodes. As known in the art, one difference between a lumped electrode and a traveling-wave electrode is that, for the latter, the electrode length along the waveguide arm is not small compared to the wavelength of the corresponding RF drive signal, such as signal 218. As a result, electrodes 214 and 216 function as an extension of the driving transmission line that delivers signal 218 to the electrodes and are typically designed to approximately match the impedance of that transmission line. The driving transmission line is electrically connected to apply signal 218 to the first (e.g., left in FIG. 2) ends of electrodes 214 and 216. The second (e.g., right in FIG. 2) ends of electrodes 214 and 216 are connected to another transmission line, labeled 240, whose impedance is similarly matched to the impedance of the electrodes. Transmission line 240 is connected to an ADC 250, which is further connected to the DSP as indicated in FIG. 2. In an example embodiment, transmission line 240 can be a part of one of feedback paths 180 (FIG. 1), and ADC 250 can be one of ADCs 150 (FIG. 1). The points of connection of transmission line 240 to electrodes 214 and 216 can serve as a pick-up terminal for the feedback path 180.

Figure 3:
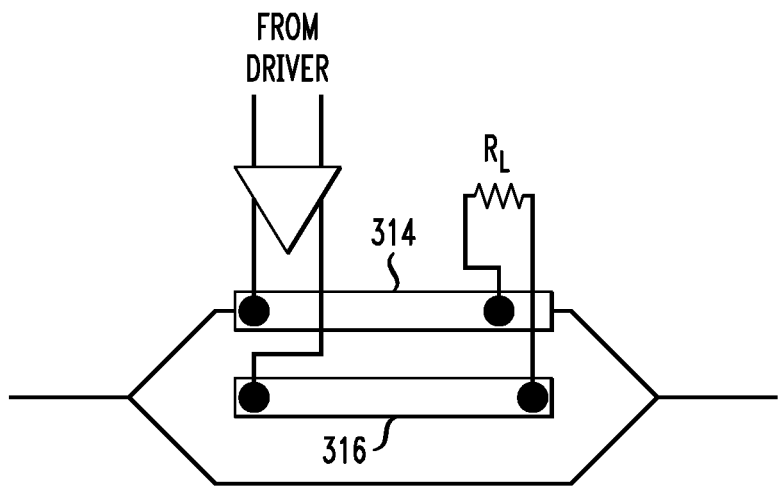
FIG. 3 schematically shows conventional radio-frequency termination of traveling-wave electrodes in a Mach-Zehnder modulator.

FIG. 3 schematically shows a conventional RF termination of traveling-wave electrodes 314 and 316, which can be compared and contrasted with the RF termination of electrodes 214 and 216 shown in FIG. 2. Electrodes 314 and 316 are generally analogous to electrodes 214 and 216 (FIG. 2). However, the sole purpose of the RF termination provided by a load resistor $R_L$ connected to electrodes 314 and 316 is to avoid signal reflections from the right end of the electrodes. Hence, load resistor $R_L$ is not connected to any external circuits and essentially is an internal component of the corresponding Mach-Zehnder modulator. In contrast, the right ends of electrodes 214 and 216 are RF terminated by being connected to transmission line 240 that leads to the electrical circuits that are external to Mach-Zehnder modulator 210, such as ADC 250.

Figure 4:
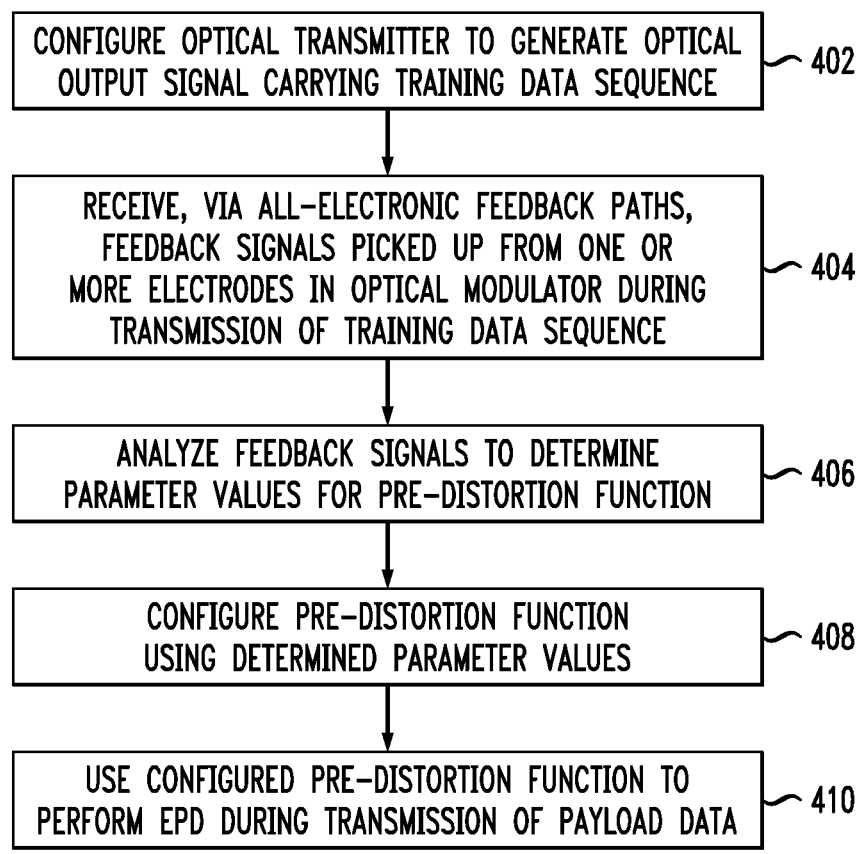
FIG. 4 shows a flowchart of an electronic pre-distortion method that can be used in the transponder of FIG. 1 according to an embodiment of the disclosure.

FIG. 4 shows a flowchart of an EPD method 400 that can be used in transponder 100 (FIG. 1) according to an embodiment of the disclosure. Method 400 can be run periodically or non-periodically, e.g., as deemed necessary for maintaining an acceptable quality of optical output signal 188 generated by transponder 100. In some embodiments, method 400 may be advantageously combined with other known or conventional EPD methods, e.g., directed at the pre-compensation of signal distortions imposed in the optical transport link, i.e., in the communication-system components external to transponder 100. One of ordinary skill in the art will appreciate that such external signal distortions may include but are not limited to chromatic dispersion, polarization-mode dispersion, and nonlinearly induced inter-symbol interference.

At step 402 of method 400, DSP 120 configures transmitter 170 to generate an optical output signal 188 carrying a training data sequence. In some embodiments, the training data sequence may be a part of a pilot signal or sequence used for other purposes, such as frame synchronization, etc. In this case, the pilot signal or sequence may be used synergistically for multiple purposes, one of which includes an implementation of step 402 in method 400. In alternative embodiments, the training data sequence may be specifically configured to appropriately sample the full range of signal distortions caused by transmitter 170.

At step 404, DSP 120 receives, via feedback paths 180, the feedback signals 154 picked up, e.g., as illustrated in FIG. 2, from one or more electrodes in optical modulator 176 during the transmission of the training data sequence of step 402. In some embodiments, DSP 120 may be optionally configured to store a copy of the received feedback signals 154 in a memory (not explicitly shown in FIG. 1), e.g., for further use at step 406.

At step 406, DSP 120 analyzes the feedback signals 154 received at step 404 to determine a set of parameter values for a pre-distortion function to be applied to the waveforms corresponding to payload data 112 in the process of generating electrical digital signals 124. In an example embodiment, the analysis may include a step of comparing the waveforms provided by feedback signals 154 with a waveform template. The waveform template may include a set of waveforms that are expected or desired when transmitter 170 operates in an optimal regime while transmitting the training data sequence. Based on this comparison, DSP 120 determines the parameter values for the pre-distortion function that tend to minimize or at least reduce to an acceptable level the differences between the waveform template and a signal that is generated by convolving the feedback signal(s) with the pre-distortion function.

At step 408, DSP 120 configures the pre-distortion function using the parameter values determined at step 406. In an example embodiment, the application of the pre-distortion function to data stream 112 in DSP 120 can be accomplished using a digital filter, such as a finite-impulse-response (FIR) filter. Both time-domain and frequency-domain implementations of the FIR filter are contemplated. In this case, the parameter values of the pre-distortion function that are set at step 408 may include a set of tap coefficients of the FIR filter or frequency-domain equivalents thereof. In an alternative embodiment, the application of the pre-distortion function to data stream 112 in DSP 120 can be accomplished using a look-up table (LUT). In the latter case, the parameter values of the pre-distortion function that are set at step 408 may include pattern-dependent correction information extracted at step 406 and stored in the LUT for further use during the payload-data transmission of step 410. In some embodiments, the pre-distortion function may be configured using the appropriate Volterra series, e.g., as disclosed in the following publications: (i) Fadhel M. Ghannouchi and Oualid Hammi, "Behavioral Modeling and Predistortion," IEEE Microwave Magazine, December 2009; and (ii) Dennis R. Morgan, Zhengxiang Ma, Jaehyeong Kim, et al., "A Generalized Memory Polynomial Model for Digital Predistortion of RF Power Amplifiers," IEEE Transactions on Signal Processing—TSP, 2006, vol. 54, no. 10, pp. 3852-3860, both of which are incorporated herein by reference in their entirety.

At step 410, DSP 120 uses the pre-distortion function configured at step 408 to perform the EPD, in real time, on data stream 112. Due to the EPD performed in DSP 120, transmitter 170 is advantageously capable of causing optical output signal 188 to carry the payload data of data stream 112 using desired or optimal optical waveforms.

Figure 5:
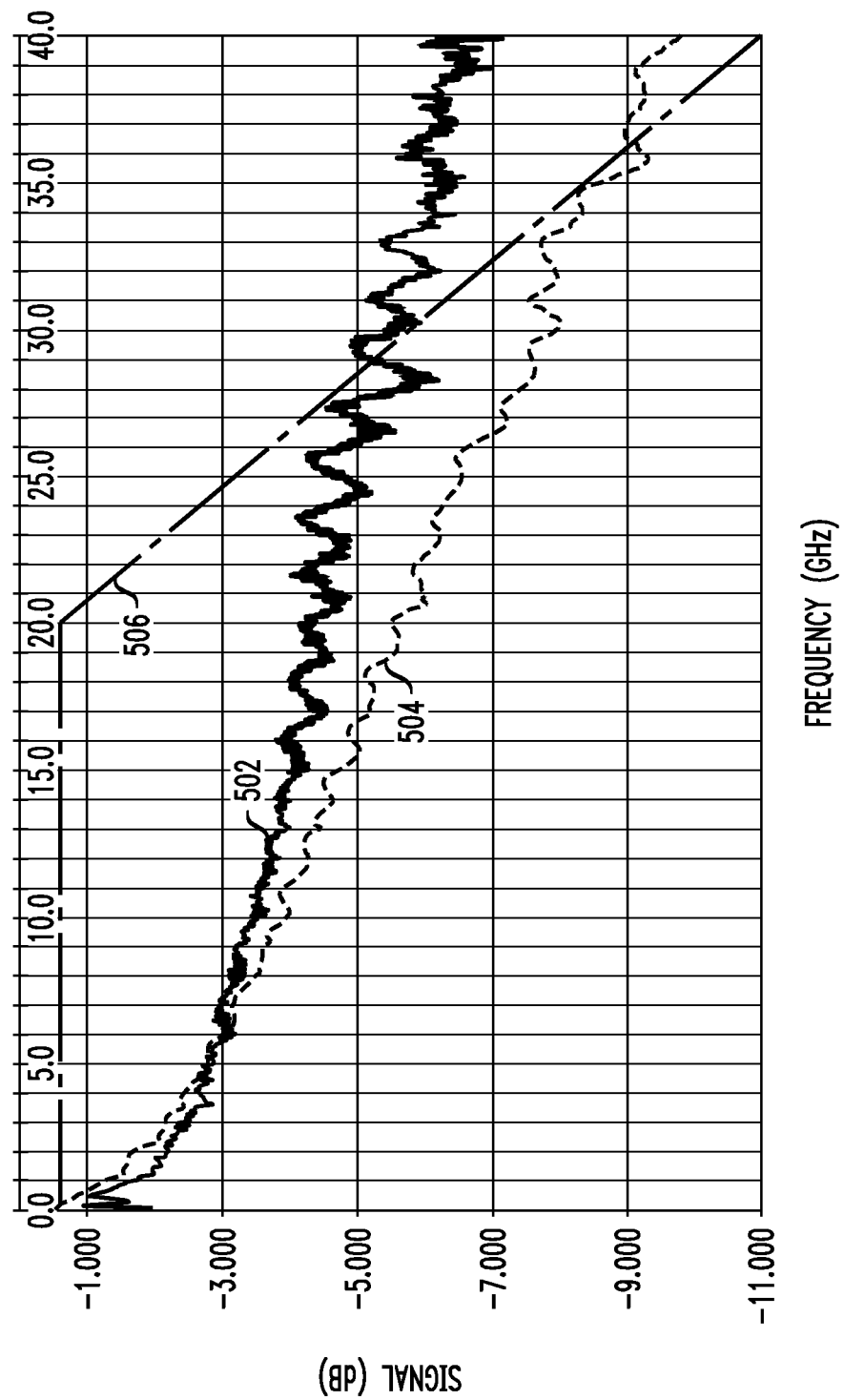
FIG. 5 graphically illustrates the use of all-electronic feedback paths in the method of FIG. 4 according to an embodiment of the disclosure.

FIG. 5 graphically illustrates the use of all-electronic feedback paths 180 (FIG. 1) in EPD method 400 (FIG. 4) according to an embodiment of the disclosure. More specifically, a curve 502 graphically shows a frequency response (signal-transfer function) of modulator 210 measured at an optical output thereof, such as an output waveguide 260 (see FIG. 2). A curve 504 similarly graphically shows a frequency response of modulator 210 measured at the end of transmission line 240 (FIG. 2). A curve 506 graphically shows an example desired effective frequency response of modulator 210 at output waveguide 260. One purpose of EPD method 400 may be to configure and apply the pre-distortion function that causes the hardware-imposed signal-transfer function 502 to be transformed into the effective signal-transfer function 506. Example rationales for such a transformation and alternative desired effective frequency responses of modulator 210 are disclosed and explained, e.g., in U.S. Patent Application Publication No. 2014/0029957, which is incorporated herein by reference in its entirety.

The shape of the hardware-imposed signal-transfer function 502 generally varies among different nominally identical physical copies of the same model of circuit 200 (FIG. 2) or transmitter 170 (FIG. 1). In addition, the shape of the hardware-imposed signal-transfer function 502 may change over time, e.g., due to the device aging, etc. As already indicated above, in situ measurements of the hardware-imposed signal-transfer function 502 generally require tapping the optical output signal generated by the transmitter and then using a dedicated optical receiver coupled to the optical tap for the detection of the tapped optical signal. As such, the in situ measurement capability may be relatively expensive to implement and not always available in the corresponding optical transponder.

Various embodiments of transponder 100 disclosed herein at least partially overcome these and some other related problems, in effect, by using the electrically picked-up and measured frequency response analogous to frequency response 504 as a proxy for the hardware-imposed signal-transfer function 502, which is not directly measured in transponder 100. Comparison of curves 502 and 504 reveals that, although curves 502 and 504 have different general slopes (or tilts) at frequencies higher than about 5 GHz, curve 504 faithfully reproduces many of the features of the fine structure of curve 502. Note that the wiggles in both curves are not noise, but rather are reproducible attributes of the hardware performance. Further note the similarities in the wiggle patterns in curves 502 and 504. These similarities enable EPD method 400 to arrive at the pre-distortion function that causes the actually achieved frequency response to closely approximate the desired frequency response, such as that graphically shown by curve 506. As such, EPD method 400 in effect starts from curve 504, as opposed to starting from curve 502, to arrive at curve 506. Since the in situ measurement of curve 504 does not require an optical tap and a dedicated optical receiver, the cost of the EPD functionality in transponder 100 may be significantly lower than the cost of the EPD functionality in a comparably performing optical transponder, such as a transponder that relies exclusively on optical feedback for properly configuring its pre-distortion function.

In some embodiments, EPD method 400 may be modified to include the steps of (i) estimating curve 502 based on curve 504 and (ii) deriving the parameters of and configuring the pre-distortion function based on the estimated curve 502. As already indicated above, the actual curve 502 is not measured in transponder 100. However, the general slope difference between curves 502 and 504 can be derived sufficiently accurately by modeling the electro-optical signal conversion performed in the corresponding optical modulator. The results of the modeling can be incorporated, e.g., as a tilt-compensating template, into the software or firmware used in DSP 120. An application of this tilt-compensating template to the actually measured curve 504 then produces a relatively accurate estimate of curve 502, wherein the tilt-compensating template causes the estimated curve 502 to have an approximately correct slope (tilt), while the fine structure of the measured curve 504 supplies an approximately correct fine structure for the estimated curve 502. The resulting estimated curve 502 can then be used in the above-mentioned step (ii) in lieu of the actual (unmeasured) curve 502 to arrive at the requisite pre-distortion function using any of the suitable methods developed for deriving the pre-distortion function based on the optical feedback obtained by tapping the modulator's optical output.

Figure 6:
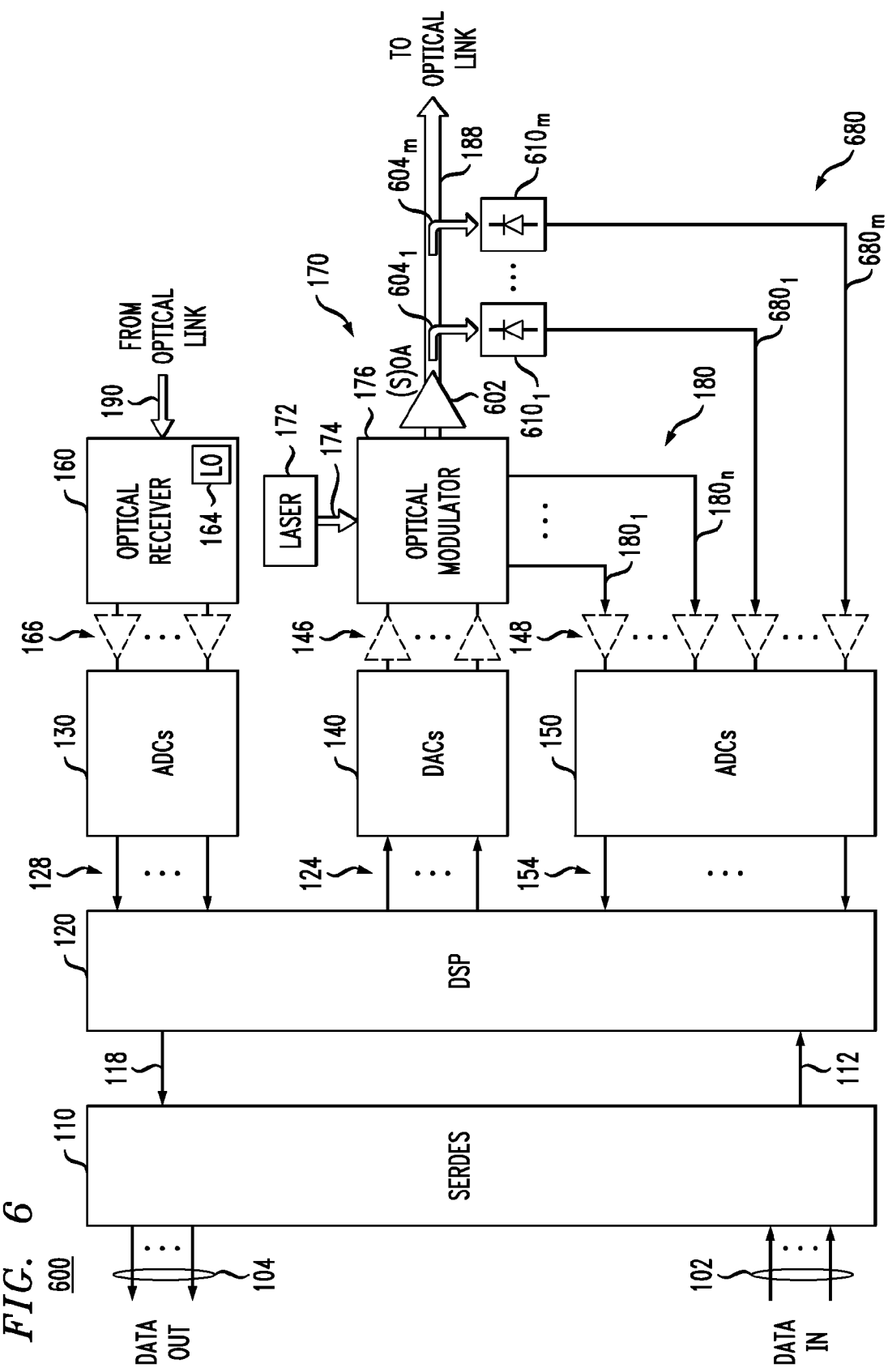
FIG. 6 shows a block diagram of an optical transponder according to an alternative embodiment of the disclosure.

FIG. 6 shows a block diagram of an optical transponder 600 according to an alternative embodiment of the disclosure. Transponder 600 is generally similar to transponder 100 (FIG. 1) and, as such, reuses many of the same components. The description of the reused components is not repeated here. Rather, the description of transponder 600 herein below focuses mainly on the new components and differences with transponder 100.

One difference between transponders 100 and 600 is that the latter has a plurality of partially optical feedback paths 680 (labeled $680_1$-$680_m$, where m is a positive integer greater than one). For example, a j-th feedback path $680_j$ includes an optical tap $604_j$ configured to optically tap optical output signal 188 and direct the tapped portion of that signal to a photo-detector (e.g., photodiode) $610_j$. Photo-detector $610_j$ operates to convert the optical signal received from optical tap $604_j$ into a corresponding electrical signal and then apply this electrical signal to an electrical conductor connected to an input port of one of (optional) electrical amplifiers 148. A corresponding amplified electrical signal generated by that electrical amplifier 148 is then converted into digital form in the corresponding one of ADCs 150 to generate a respective one of additional feedback signals 154. Note that feedback paths 680 do not qualify as all-electronic feedback pats, e.g., because each of them includes an O/E converter embodied by the respective one of photo-detectors 610.

As the labeling in FIG. 6 implies, transponder 600 uses n+m feedback signals 154, compared to just n feedback signals 154 in transponder 100. This difference causes transponder 600 to also employ more electrical amplifiers 148 and ADCs 150 than transponder 100. In some embodiments, transponder 600 may also incorporate an optional semiconductor optical amplifier (SOA) 602 coupled to the output of optical modulator 176 as indicated in FIG. 6.

In an example embodiment, feedback paths 680 may be used to at least partially sample one or more frequency responses (signal-transfer functions) of transmitter 170 exemplified by curve 502 shown in FIG. 5. This sampling can be used in DSP 120, e.g., to improve the accuracy of approximating a desired frequency response (e.g., curve 506 in FIG. 5). One of ordinary skill in the art will appreciate that the accuracy of the approximation may be improved because the set of parameters for the pre-distortion function can now be determined more accurately based on the additional hardware-performance information corresponding to curve 502, as opposed to based on the hardware-performance information corresponding only to curve 504, as in transponder 100.

In embodiments that include SOA 602, feedback paths 680 may further be used to enable DSP 120 to pre-compensate for linear and/or non-linear signal distortions imposed by the SOA.

In some embodiments, suitable coherent optical detectors can be used to replace some or all of photo-detectors 610. In one embodiment, each of these coherent optical detectors may include an individual local-oscillator source similar to local oscillator source 164 used in optical receiver 160. In an alternative embodiment, each of these coherent optical detectors may be coupled to receive a portion of optical beam 174 for use therein as a local-oscillator signal. One of ordinary skill in the art will appreciate that the use of coherent optical detectors instead of photo-detectors 610 may further improve the accuracy of approximating a desired frequency response.

Although various embodiments have been described in reference to circuit 200 (FIG. 2) having only two electrodes in modulator 210, other electrode and electrical-signal pick-up configurations are also possible. For example, U.S. patent application Ser. No. 14/202,703, filed on Mar. 10, 2014, discloses optical modulators having three or more electrodes that may also be used in various embodiments of optical modulator 176. Using the above-provided description, one of ordinary skill in the art will understand how to connect such multiple electrodes to all-electronic feedback paths similar to feedback paths 180, e.g., to enable the generation of more than one feedback signal 154 per Mach-Zehnder modulator. U.S. patent application Ser. No. 14/202,703 is incorporated herein by reference in its entirety.

The use of alternative modulator structures, e.g., different from the structure of Mach-Zehnder modulator 210, are also contemplated.

According to an example embodiment disclosed above in reference to FIGS. 1-6, provided is an apparatus (e.g., 100, FIG. 1; 600, FIG. 6) comprising: an optical transmitter (e.g., 170, FIG. 1) configured to generate a modulated optical signal (e.g., 188, FIG. 1) based on an electrical digital signal (e.g., 124, FIG. 1); a digital signal processor (e.g., 120, FIG. 1) configured to apply electronic pre-distortion (e.g., according to 400, FIG. 4) to generate the electrical digital signal in a manner that reduces an amount of signal distortions in the modulated optical signal caused by hardware (e.g., 146, 176, 602; FIG. 6) of the optical transmitter; and a first all-electronic feedback path (e.g., 180$_1$, FIG. 1) between the optical transmitter and the digital signal processor configured to provide a first feedback signal (e.g., one of 154, FIG. 1) for the digital signal processor to determine one or more parameter values for the electronic pre-distortion.

In some embodiments of the above apparatus, the electronic pre-distortion is configured to cause an effective signal-transfer function (e.g., 506, FIG. 5) exhibited by the optical transmitter to differ from a signal-transfer function (e.g., 502, FIG. 5) imposed by the hardware of the optical transmitter. As used herein, the term "effective signal-transfer function" refers to the signal-transfer function exhibited by the optical transmitter due to the convolution, in the chain of signal processing, of the EPD function imposed by the DSP and the signal-transfer function imposed by the hardware of the optical transmitter. The effective signal-transfer function may be linear or nonlinear.

In some embodiments of any of the above apparatus, the apparatus further comprises a second all-electronic feedback path (e.g., 180$_n$, FIG. 1) between the optical transmitter and the digital signal processor configured to provide a second feedback signal (e.g., another one of 154, FIG. 1) for the digital signal processor to determine the one or more parameter values for the electronic pre-distortion.

In some embodiments of any of the above apparatus, the apparatus further comprises a first partially optical feedback path (e.g., 680$_1$, FIG. 6) between the optical transmitter and the digital signal processor configured to provide a third feedback signal (e.g., yet another one of 154, FIG. 6) for the digital signal processor to determine the one or more parameter values for the electronic pre-distortion.

In some embodiments of any of the above apparatus, the apparatus further comprises a second partially optical feedback path (e.g., 680$_m$, FIG. 6) between the optical transmitter and the digital signal processor configured to provide a fourth feedback signal (e.g., yet another one of 154, FIG. 6) for the digital signal processor to determine the one or more parameter values for the electronic pre-distortion.

In some embodiments of any of the above apparatus, the apparatus further comprises a first partially optical feedback path (e.g., 680$_1$, FIG. 6) between the optical transmitter and the digital signal processor configured to provide a second feedback signal (e.g., another one of 154, FIG. 6) for the digital signal processor to determine the one or more parameter values for the electronic pre-distortion.

In some embodiments of any of the above apparatus, the first partially optical feedback path comprises: an optical tap (e.g., 604$_1$, FIG. 6) configured to tap out a portion of an optical power of the modulated optical signal; an optical-to-electrical converter (e.g., 610$_1$, FIG. 6) configured to convert the portion of the optical power of the modulated optical signal into a corresponding electrical signal; and an electrical conductor (e.g., the electrical line connecting 610$_1$ and 148, FIG. 6) configured to direct the corresponding electrical signal to an input interface of the digital signal processor to provide thereat the second feedback signal.

In some embodiments of any of the above apparatus, the optical-to-electrical converter comprises a photodiode (e.g., 610$_1$, FIG. 6).

In some embodiments of any of the above apparatus, the optical-to-electrical converter comprises a coherent optical detector coupled to an optical local-oscillator source (e.g., 164, FIG. 6).

In some embodiments of any of the above apparatus, the optical transmitter comprises an optical modulator (e.g., 210, FIG. 2).

In some embodiments of any of the above apparatus, the first all-electronic feedback path comprises: an electrical pick-up terminal located in an electrical-circuit portion of the optical modulator; and an electrical conductor (e.g., 240, FIG. 2) configured to direct an electrical signal picked-up by the electrical pick-up terminal to an input interface of the digital signal processor to provide thereat the first feedback signal.

In some embodiments of any of the above apparatus, the optical modulator comprises: an optical waveguide (e.g., 212$_1$, FIG. 2); a first electrode (e.g., 214, FIG. 2) positioned along a length of the optical waveguide and having a first end (e.g., the left end in FIG. 2) and a second end (e.g., the right end in FIG. 2), wherein: the first end is configured to receive an electrical drive signal (e.g., 218, FIG. 2) generated based on the electrical digital signal; and the electrical pick-up terminal (e.g., end of 240, FIG. 2) is electrically connected to the second end.

In some embodiments of any of the above apparatus, the optical transmitter is configured to generate the electrical drive signal in a manner that causes the first electrode to operate as a traveling-wave electrode.

In some embodiments of any of the above apparatus, the apparatus further comprises a second all-electronic feedback path (e.g., 180$_n$, FIG. 1) between the optical transmitter and the digital signal processor configured to provide a second feedback signal (e.g., another one of 154, FIG. 1) for the digital signal processor to determine the one or more parameter values for the electronic pre-distortion, wherein the second all-electronic feedback path comprises: an additional electrical pick-up terminal; and an additional electrical conductor configured to direct an electrical signal picked-up by the additional electrical pick-up terminal to the input interface of the digital signal processor to provide thereat the second feedback signal.

In some embodiments of any of the above apparatus, the optical modulator further comprises a second electrode (e.g., as described in U.S. patent application Ser. No. 14/202,703) positioned along a length of the optical waveguide.

In some embodiments of any of the above apparatus, the additional electrical pick-up terminal is electrically connected to the second electrode.

In some embodiments of any of the above apparatus, the optical transmitter comprises an additional optical modulator (e.g., another physical copy of 210, FIG. 2); the additional optical modulator comprises a second electrode (e.g., another physical copy of 214, FIG. 2) positioned along a length of another optical waveguide; and the additional electrical pick-up terminal is electrically connected to the second electrode.

In some embodiments of any of the above apparatus, the optical modulator and the additional optical modulator are optically coupled to one another by at least one optical waveguide.

In some embodiments of any of the above apparatus, the first all-electronic feedback path comprises an analog-to-digital converter (e.g., 150, FIG. 1).

In some embodiments of any of the above apparatus, the first all-electronic feedback path further comprises an electrical amplifier (e.g., 148, FIG. 1).

According to another example embodiment disclosed above in reference to FIGS. 1-6, provided is an electronic pre-distortion method (e.g., 400, FIG. 4) comprising the steps of: (A) configuring (e.g., 402, FIG. 4) an optical transmitter (e.g., 170, FIG. 1) to generate an optical output signal (e.g., 188, FIG. 1) carrying a training data sequence; (B) receiving (e.g., 404, FIG. 4), via a first all-electronic feedback path (e.g., 180$_1$, FIG. 1), a first feedback signal (e.g., one of 154, FIG. 1) corresponding to the optical output signal, wherein the first all-electronic feedback path is configured to electrically connect the optical transmitter and a digital signal processor (e.g., 120, FIG. 1); (C) determining (e.g., 406, FIG. 4) one or more parameter values for electronic pre-distortion based on the training data sequence and the first feedback signal; and (D) configuring (e.g., 410, FIG. 4) the optical transmitter to generate an optical signal carrying payload data (e.g., 112, FIG. 1) with the digital signal processor being configured (e.g., 408, FIG. 4) to apply the electronic pre-distortion to the payload data using the one or more parameter values.

In some embodiments of the above method, the method further comprises the step of (E) receiving, via a second all-electronic feedback path (e.g., 180$_n$, FIG. 1), a second feedback signal (e.g., another one of 154, FIG. 1), wherein the second all-electronic feedback path is configured to electrically connect the optical transmitter and the digital signal processor, wherein step (C) comprises determining the one or more parameter values for the electronic pre-distortion based on the second feedback signal.

In some embodiments of any of the above methods, the method further comprises receiving, via a first partially optical feedback path (e.g., 680$_1$, FIG. 6), a third feedback signal (e.g., yet another one of 154, FIG. 6), wherein the first partially optical feedback path is configured to electrically connect the optical transmitter and the digital signal processor; and step (C) comprises determining the one or more parameter values for the electronic pre-distortion based on the third feedback signal.

In some embodiments of any of the above methods, the step of determining comprises: estimating, based on first feedback signal, a frequency response (e.g., 502, FIG. 5) of the optical transmitter that would have been measured at an optical output thereof; and determining the one or more parameter values for electronic pre-distortion based on the estimated frequency response.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain various embodiments may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

What is claimed is:

1. An apparatus comprising:
an optical modulator configured to generate a modulated optical signal based on an electrical digital signal, wherein the optical modulator comprises:
an optical waveguide;
a first electrode positioned along a length of the optical waveguide and having a first end and a second end, with the first end being electrically connected to receive an electrical drive signal generated using the electrical digital signal;
a digital signal processor configured to apply electronic pre-distortion to generate the electrical digital signal in a manner that reduces an amount of signal distortion in the modulated optical signal caused by hardware of the optical modulator; and
a first all-electronic feedback path between the optical modulator and the digital signal processor, wherein the first all-electronic feedback path comprises a transmission line electrically connected to the second end of the first electrode to transmit a first feedback signal to an analog-to-digital converter connected between the transmission line and the digital signal processor; and
wherein the digital signal processor is configured to apply the electronic pre-distortion based on a digital form of the first feedback signal generated by the analog-to-digital converter.

2. The apparatus of claim 1, wherein the electronic pre-distortion causes an effective signal-transfer function exhibited by the optical modulator to differ from a signal-transfer function imposed by the hardware of the optical modulator.

3. The apparatus of claim 1, further comprising a second all-electronic feedback path between the optical modulator and the digital signal processor that is electrically connected to transmit a second feedback signal to the digital signal processor, wherein the digital signal processor is further configured to apply the electronic pre-distortion based on a digital form of the second feedback signal.

4. The apparatus of claim 3, further comprising a first partially optical feedback path between the optical modulator and the digital signal processor connected to an optical output of the optical modulator to transmit a third feedback signal to the digital signal processor, wherein the digital signal processor is further configured to apply the electronic pre-distortion based on a digital form of the third feedback signal.

5. The apparatus of claim 4, further comprising a second partially optical feedback path between the optical modulator and the digital signal processor connected to an optical output of the optical modulator to transmit a fourth feedback signal to the digital signal processor, wherein the digital signal processor is further configured to apply the electronic pre-distortion based on a digital form of the fourth feedback signal.

6. The apparatus of claim 1, further comprising a first partially optical feedback path between the optical modulator and the digital signal processor connected to an optical output of the optical modulator to transmit a second feedback signal to the digital signal processor, wherein the digital signal processor is further configured to apply the electronic pre-distortion based on a digital form of the second feedback signal.

7. The apparatus of claim 6, wherein the first partially optical feedback path comprises:
an optical tap configured to tap out a portion of an optical power of the modulated optical signal;
an optical-to-electrical converter configured to convert the portion of the optical power of the modulated optical signal into a corresponding electrical signal; and
an electrical conductor configured to direct the corresponding electrical signal to a respective analog-to-digital converter connected between the electrical conductor and the digital signal processor.

8. The apparatus of claim 7, wherein the optical-to-electrical converter comprises a photodiode.

9. The apparatus of claim 7, wherein the optical-to-electrical converter comprises a coherent optical detector coupled to an optical local-oscillator source.

10. The apparatus of claim 1, wherein the electrical drive signal causes the first electrode to operate as a traveling-wave electrode.

11. The apparatus of claim 1,
wherein the optical modulator further comprises a second electrode positioned along a length of the optical waveguide; and
wherein the transmission line is electrically connected to the second electrode.

12. The apparatus of claim 1, wherein the first all-electronic feedback path comprises the analog-to-digital converter.

13. An electronic pre-distortion method comprising:
configuring an optical modulator to generate an optical output signal carrying a training data sequence, wherein the optical modulator comprises:
an optical waveguide;
a first electrode positioned along a length of the optical waveguide and having a first end and a second end, with the first end being electrically connected to receive an electrical drive signal generated using the training data sequence;
receiving, via a first all-electronic feedback path between the optical modulator and a digital signal processor, a first feedback signal, wherein the first all-electronic feedback path comprises a transmission line electrically connected to the second end of the first electrode and an analog-to-digital converter connected between the transmission line and the digital signal processor;
determining one or more parameter values for electronic pre-distortion based on the training data sequence and the first feedback signal; and
configuring the optical modulator to generate an optical signal carrying payload data by applying to the optical modulator a corresponding electrical drive signal generated using the electronic pre-distortion.

14. The method of claim 13, further comprising receiving, via a second all-electronic feedback path, a second feedback signal, wherein the second all-electronic feedback path electrically connects the optical transmitter and the digital signal processor; and
wherein the step of determining comprises determining the one or more parameter values for the electronic pre-distortion based on the second feedback signal.

15. The method of claim 13, further comprising receiving, via a first partially optical feedback path, a second feedback signal, wherein the first partially optical feedback path is connected between an optical output of the optical modulator and the digital signal processor; and wherein the step of determining comprises determining the one or more parameter values for the electronic pre-distortion based on the second feedback signal.

16. The method of claim 13, wherein the step of determining comprises:
  estimating, based on the first feedback signal, a frequency response of the optical modulator at an optical output thereof; and
  determining the one or more parameter values for the electronic pre-distortion based on the estimated frequency response.

17. The apparatus of claim 1, wherein an impedance of the transmission line matches an impedance corresponding to the first electrode.

* * * * *